(12) United States Patent
Seem et al.

(10) Patent No.: US 8,473,080 B2
(45) Date of Patent: *Jun. 25, 2013

(54) CONTROL OF COOLING TOWERS FOR CHILLED FLUID SYSTEMS

(75) Inventors: John E. Seem, Glendale, WI (US); Yaoyu Li, Franklin, WI (US)

(73) Assignee: Johnson Controls Technology Company, Holland, MI (US)

( * ) Notice: Subject to any disclaimer, the term of this patent is extended or adjusted under 35 U.S.C. 154(b) by 222 days.

This patent is subject to a terminal disclaimer.

(21) Appl. No.: 12/777,097

(22) Filed: May 10, 2010

(65) Prior Publication Data

US 2011/0276182 A1    Nov. 10, 2011

(51) Int. Cl.
G06F 19/00    (2006.01)

(52) U.S. Cl.
USPC .................................. 700/28; 700/43; 702/85

(58) Field of Classification Search
USPC ......... 700/28, 37, 276, 277, 174, 275, 31–33; 318/609; 62/171, 183, 129, 186
See application file for complete search history.

(56) References Cited

U.S. PATENT DOCUMENTS

| | | | | |
|---|---|---|---|---|
| 4,085,594 A | * | 4/1978 | Mayer | 62/171 |
| 4,199,101 A | | 4/1980 | Bramow et al. | |
| 4,257,238 A | | 3/1981 | Kountz et al. | |
| 4,319,461 A | | 3/1982 | Shaw | |
| 4,474,027 A | * | 10/1984 | Kaya et al. | 62/171 |
| 4,507,930 A | * | 4/1985 | Kaya et al. | 62/129 |
| 4,512,161 A | | 4/1985 | Logan et al. | |
| 4,876,858 A | | 10/1989 | Shaw et al. | |
| 4,942,740 A | | 7/1990 | Shaw et al. | |
| 5,040,377 A | * | 8/1991 | Braun et al. | 62/183 |
| 5,346,129 A | | 9/1994 | Shah et al. | |
| 5,355,305 A | | 10/1994 | Seem et al. | |
| 5,414,640 A | | 5/1995 | Seem | |
| 5,461,877 A | | 10/1995 | Shaw et al. | |

(Continued)

FOREIGN PATENT DOCUMENTS

| | | |
|---|---|---|
| SU | 535103 A | 11/1976 |
| WO | WO 00/68744 A1 | 11/2000 |
| WO | WO 2009/012269 A2 | 1/2009 |
| WO | WO 2009/012282 A2 | 1/2009 |

OTHER PUBLICATIONS

Brandemuehl et al., Implementation of On-Line Optimal Supervisory Control of Cooling Plants Without Storage, Joint Center for Energy Management, University of Colorado, May 1998, 149 pages.

(Continued)

Primary Examiner — Kidest Bahta
(74) Attorney, Agent, or Firm — Foley & Lardner LLP

(57) ABSTRACT

A system for controlling a cooling tower that cools condenser fluid for a condenser of a chiller includes a cooling tower fan system that controllably varies a speed of at least one fan motor. The system further includes an extremum seeking controller that receives inputs of power expended by the cooling tower fan system and of power expended by the chiller. The extremum seeking controller provides an output to the cooling tower fan system that controls the speed of the at least one fan motor. The extremum seeking controller determines the output by searching for a speed of the at least one fan motor that minimizes the sum of the power expended by the cooling tower fan system and the power expended by the chiller.

8 Claims, 12 Drawing Sheets

U.S. PATENT DOCUMENTS

| | | | |
|---|---|---|---|
| 5,506,768 A | 4/1996 | Seem et al. | |
| 5,515,265 A * | 5/1996 | Van As et al. | 700/28 |
| 5,555,195 A | 9/1996 | Jensen et al. | |
| 5,568,377 A * | 10/1996 | Seem et al. | 700/37 |
| 5,590,830 A | 1/1997 | Kettler et al. | |
| 5,600,960 A * | 2/1997 | Schwedler et al. | 62/99 |
| 5,682,329 A | 10/1997 | Seem et al. | |
| 5,791,408 A | 8/1998 | Seem | |
| 5,867,384 A | 2/1999 | Drees et al. | |
| 6,006,142 A * | 12/1999 | Seem et al. | 700/276 |
| 6,122,605 A | 9/2000 | Drees et al. | |
| 6,219,590 B1 | 4/2001 | Bernaden, III et al. | |
| 6,223,544 B1 | 5/2001 | Seem | |
| 6,257,007 B1 * | 7/2001 | Hartman | 62/183 |
| 6,265,843 B1 | 7/2001 | West et al. | |
| 6,269,650 B1 | 8/2001 | Shaw | |
| 6,296,193 B1 * | 10/2001 | West et al. | 236/13 |
| 6,326,758 B1 * | 12/2001 | Discenzo | 318/609 |
| 6,369,716 B1 | 4/2002 | Abbas et al. | |
| 6,389,331 B1 | 5/2002 | Jensen et al. | |
| 6,408,228 B1 | 6/2002 | Seem et al. | |
| 6,415,617 B1 | 7/2002 | Seem | |
| 6,446,448 B1 * | 9/2002 | Wang et al. | 62/183 |
| 6,446,941 B1 * | 9/2002 | Maheshwari et al. | 261/130 |
| 6,477,439 B1 | 11/2002 | Bernaden, III et al. | |
| 6,594,554 B1 | 7/2003 | Seem et al. | |
| 6,718,779 B1 * | 4/2004 | Henry | 62/183 |
| 6,816,811 B2 | 11/2004 | Seem | |
| 6,862,540 B1 | 3/2005 | Welch et al. | |
| 6,879,881 B1 * | 4/2005 | Attridge, Jr. | 700/277 |
| 6,937,909 B2 | 8/2005 | Seem | |
| 7,031,880 B1 | 4/2006 | Seem et al. | |
| 7,124,637 B2 | 10/2006 | Singhal et al. | |
| 7,805,952 B1 * | 10/2010 | Zugibe et al. | 62/84 |
| 7,827,813 B2 * | 11/2010 | Seem | 62/186 |
| 2004/0164690 A1 | 8/2004 | Degner et al. | |
| 2005/0006488 A1 | 1/2005 | Stanimirovic | |
| 2005/0040250 A1 | 2/2005 | Wruck | |
| 2006/0090467 A1 | 5/2006 | Crow | |
| 2006/0259285 A1 | 11/2006 | Bahel et al. | |
| 2008/0148767 A1 | 6/2008 | De Larminat et al. | |
| 2008/0179408 A1 | 7/2008 | Seem | |
| 2008/0179409 A1 * | 7/2008 | Seem | 236/49.3 |
| 2009/0083583 A1 * | 3/2009 | Seem et al. | 714/39 |
| 2010/0006265 A1 | 1/2010 | De Larminat et al. | |

OTHER PUBLICATIONS

Lu et al., Global Optimization for Overall HVAC Systems—Part I Problem Formulation and Analysis, Energy Conversion and Management, 46, 2005, pp. 999-1014.

Ma et al., Online Performance Evaluation of Alternative Control Strategies for Building Cooling Water Systems Prior to in situ Implementation, Applied Energy, 86, 2009, pp. 712-721.

Tyagi et al., An Extremum Seeking Algorithm for Determining the Set Point Temperature for Condensed Water in a Cooling Tower, Proceedings of the 2006 American Control Conference, Minneapolis, MN, Jun. 14-16, 2006, 5 pages.

Yu et al., Optimization of Water-Cooled Chiller System with Load-Based Speed Control, Applied Energy, 85, 2008, pp. 931-950.

Adetola et al., Adaptive Extremum-Seeking Receding Horizon Control of Nonlinear Systems, American Control Conference Proceedings, 2004, pp. 2937-2942.

Adetola et al., Adaptive Output Feedback Extremum Seeking Receding Horizon Control of Linear Systems, ScienceDirect, Elsevier, Journal of Process Control, vol. 16, 2006, pp. 521-533.

Adetola et al., Parameter Convergence in Adaptive Extremum-Seeking Control, ScienceDirect, Elsevier, Automatica, vol. 43, available online Sep. 28, 2006, pp. 105-110.

Ariyur et al., Analysis and Design of Multivariable Extremum Seeking, Proceedings of the American Control Conference, Anchorage, Alaska, May 8-10, 2002, pp. 2903-2908.

Ariyur et al., Multivariable Extremum Seeking Feedback: Analysis and Design, 2002, 15 pages.

Ariyur et al., Slope Seeking and Application to Compressor Instability Control, Proceeding of the 41st IEEE Conference on Decision and Control, Las Vegas, Nevada, Dec. 2002, pp. 3690-3697.

Ariyur et al., Slope Seeking: A Generalization of Extremum Seeking, International Journal of Adaptive Control and Signal Processing, vol. 18, 2004, 22 pages.

Ashrae Standard, Energy Standard for Buildings Except Low-Rise Residential Buildings I-P Edition, ANSI/ASHRAE/IESNA Standard 90.1-2004, 4 pages.

Astrom et al., Optimalizing Control, Adaptive Control Second Edition, 1995, pp. 214-230, Addison-Wesley Publishing Company.

Banaszuk et al., Adaptive Control of Combustion Instability Using Extremum-Seeking, Proceedings of the American Control Conference, Chicago, Illinois, Jun. 2000, pp. 416-422.

Banavar et al., Functional Feedback in an Extremum Seeking Loop, Proceedings of the 40th IEEE Conference on Decision and Control, Orlando, Florida, Dec. 2001, 8 pages.

Banavar, Extremum Seeking Loops with Quadratic Functions: Estimation and Control, International Journal of Control, vol. 76, No. 14, 2003, pp. 1475-1482.

Beaudoin et al., Bluff-Body Drag Reduction by Extremum-Seeking Control, Journal of Fluids and Structures, vol. 22, 2006, pp. 973-978.

Binetti et al., Control of Formation Flight via Extremum Seeking, Proceedings of the American Control Conference, Anchorage, Alaska, May 8-10, 2002, pp. 2848-2853.

Blackman, Extremum-Seeking Regulators, An Exposition of Adaptive Control, Pergamon Press, 1962, 17 pages.

Cowan, Review of Recent Commercial Roof Top Unit Field Studies in the Pacific Northwest and California, report for Northwest Power and Conservation Council and Regional Technical Forum, Oct. 8, 2004, 18 pages.

DOE Federal Emergency Management Program, Actions You Can Take to Reduce Cooling Costs, taken from http://www1.eere.energy.gov/femp/pdfs/om_cooling.pdf, believed to be available May 2005, 8 pages.

Drakunov et al., ABS Control Using Optimum Search via Sliding Modes, IEEE Transactions on Control Systems Technology, vol. 3, No. 1, Mar. 1995, pp. 79-85.

Financial Times Energy, Inc. Economizers, Energy Design Resources, taken from http://www.energydesignresources.com/, believed to be available by at least Jan. 2007, 30 pages.

Guay et al., Adaptive Extremum Seeking Control of Nonlinear Dynamic Systems with Parametric Uncertainities, ScienceDiet, Pergamon, Automatica, 2003, pp. 1283-1293.

International Search Report and Written Opinion for International Patent Application No. PCT/US2008/070091, mailed Sep. 30, 2009, 13 pages.

International Search Report and Written Opinion for International Patent Application No. PCT/US2008/070118, mailed Oct. 19, 2009, 11 pages.

Killingsworth et al., PID Turning Using Extremum Seeking, IEEE Control Systems Magazine, Feb. 2006, pp. 70-79.

Krstic et al., Stability of Extremum Seeking Feedback for General Nonlinear Dynamic Systems, Automatica, vol. 36, Mar. 1997, pp. 595-601.

Krstic, Extremum Seeking Control for Discrete-Time Systems; IEEE Transactions on Automatic Control, University of California Postprints, 2002, 8 pages.

Krstic, Performance Improvement and Limitations in Extremum Seeking Control, Dec. 1998, pp. 313-326, Department of Mechanical and Aerospace Engineering, University of California-San Diego, La Jolla, CA.

Larsson, Literature Study on Extremum Control, Control and Automation Laboratory, Nov. 2001, pp. 1-14, Department of Signals and Systems, Chalmers University of Technology.

LeBlanc, Sur l'electrification des Chemins de fer au Moyen de Courants Alternatifs de Frequence Elevee, Revue Generale de l'Electricite, 1922, 4 pages.

Leyva et al., MPPT of Photovoltaic Systems using Extremum-Seeking Control, IEEE Transactions on Aerospace and Electronic Systems, vol. 42, No. 1, Jan. 2006, pp. 249-258.

Li et al., Extremum Seeking Control of a Tunable Thermoacoustic Cooler, IEEE Transactions on Control Systems Technology, vol. 13, No. 4, Jul. 2005, pp. 527-536.

Liu et al., Extremum-Seeking with Variable Gain Control for Intensifying Biogas Production in Anaerobic Fermentation, Water Science & Technology, vol. 53, No. 4-5, 2006, pp. 35-44.

Marcos et al., Adaptive Extremum-Seeking Control of a Continuous Stirred Tank Bioreactor with Haldane's Kinetics, Journal of Process Control, vol. 14, 2004, pp. 317-328.

Office Action for U.S. Appl. No. 11/699,860 dated Aug. 20, 2009, 18 pages.

Office Action for U.S. Appl. No. 11/699,859 dated Mar. 15, 2010, 12 pages.

Pan et al., Discrete-Time Extremum Seeking Algorithms, Proceedings of American Control Conference, Anchorage, Alaska, May 2002, 8 pages.

Popovic et al., Extremum Seeking Methods for Optimzation of Variable Cam Timing Engine Operation, Proceedings of the American Control Conference, Jun. 4-6, 2003, Denver, Colorado, pp. 3136-3141.

Rotea, Analysis of Multivariable Extremum Seeking Algorithms, Proceedings of the American Control Conference, pp. 433-437, Jun. 2000, Chicago, Illinois.

Salsbury, A Controller for HVAC Systems with Embedded Fault Detection Capabilities Based on Simulation Models, presented at the International Building Simulation Conference in Kyoto, Japan, Sep. 1999, 8 pages.

Sane et al., Building HVAC Control Systems—Role of Controls and Optimization, Proceedings of the American Control Conference, Minneapolis, Minnesota, Jun. 14-16, 2006, 6 pages.

Speyer et al., Extremum Seeking Loops with Assumed Functions, Proceedings of the 39th IEEE Conference on Decision and Control, Sydney, Australia, Dec. 2000, 8 pages.

Sternby, Extremum Control Systems—An Area for Adaptive Control?, Joint Automatic Control Conference, San Francisco, California, Aug. 13-15, 1980, 12 pages.

Teel et al., Solving Smooth and Nonsmooth Multivariable Extremum Seeking Problems by the Methods of Nonlinear Programming, Proceedings of American Control Conference, Arlington, Virginia, Jun. 2001, 8 pages.

Teel, Lyapunov Methods in Nonsmooth Optimization, Part I: Quasi-Newton Algorithms for Lipschitz, Regular Functions, Proceedings of the 39th IEEE Conference on Decision and Control, Sydney, Australia, Dec. 2000, 8 pages.

Teel, Lyapunov Methods in Nonsmooth Optimization, Part II: Persistently Exciting Finite Differences, Proceedings of the 39th IEEE Conference on Decision and Control, Sydney, Australia, Dec. 2000, 8 pages.

Titica et al., Adaptive Extremum Seeking Control of Fed-Batch Bioreactors, European Journal of Control, 2003, pp. 618-631.

Tunay, Antiskid Control for Aircraft via Etremum-Seeking, Proceedings of American Control Conference, Arlington, Virginia, Jun. 2001, 8 pages.

User's Manual for ANSI/ASHRAE/IESNA Standard 90.1-2004, Energy Standard for Buildings Except Low-Rise Residential Buildings, 7 pages.

Walsh, On the Application of Multi-Parameter Extremum Seeking Control, Proceedings of the American Control Conference, pp. 411-415, Jun. 2000, Chicago, Illinois.

Wang et al., Experimental Application of Extremum Seeking on an Axial-Flow Compressor, IEEE Transactions on Control Systems Technology, vol. 8, No. 2, Mar. 2000, pp. 300-309.

Wang et al., Extremum Seeking for Limit Cycle Minimization, IEEE Transactions on Automatic Control, vol. 45, No. 12, Dec. 2000, pp. 2432-2437.

Wang et al., Optimizing Bioreactors by Extremum Seeking, International Journal of Adaptive Control and Signal Processing, 1999, pp. 651-669.

Yu et al., Extremum-Seeking Control Strategy for ABS System with Time Delay, Proceedings of American Control Conference, Anchorage, Alaska, May 2002, 8 pages.

Yu et al., Extremum-Seeking Control via Sliding Mode with Periodic Search Signals, Proceedings of the 41st IEEE Conference on Decision and Control, Las Vegas, Nevada, Dec. 2002, 8 pages.

Zhang et al., Extremum-Seeking Nonlinear Controllers for a Human Exercise Machine, IEEE/ASME Transactions on Mechatronics, vol. 11, No. 2, Apr. 2006, pp. 233-240.

Zhang, Stability and Performance Tradeoff with Discrete Time Triangular Search Minimum Seeking, Proceedings of American Control Conference, Chicago, Illinois, Jun. 2000, 7 pages.

* cited by examiner

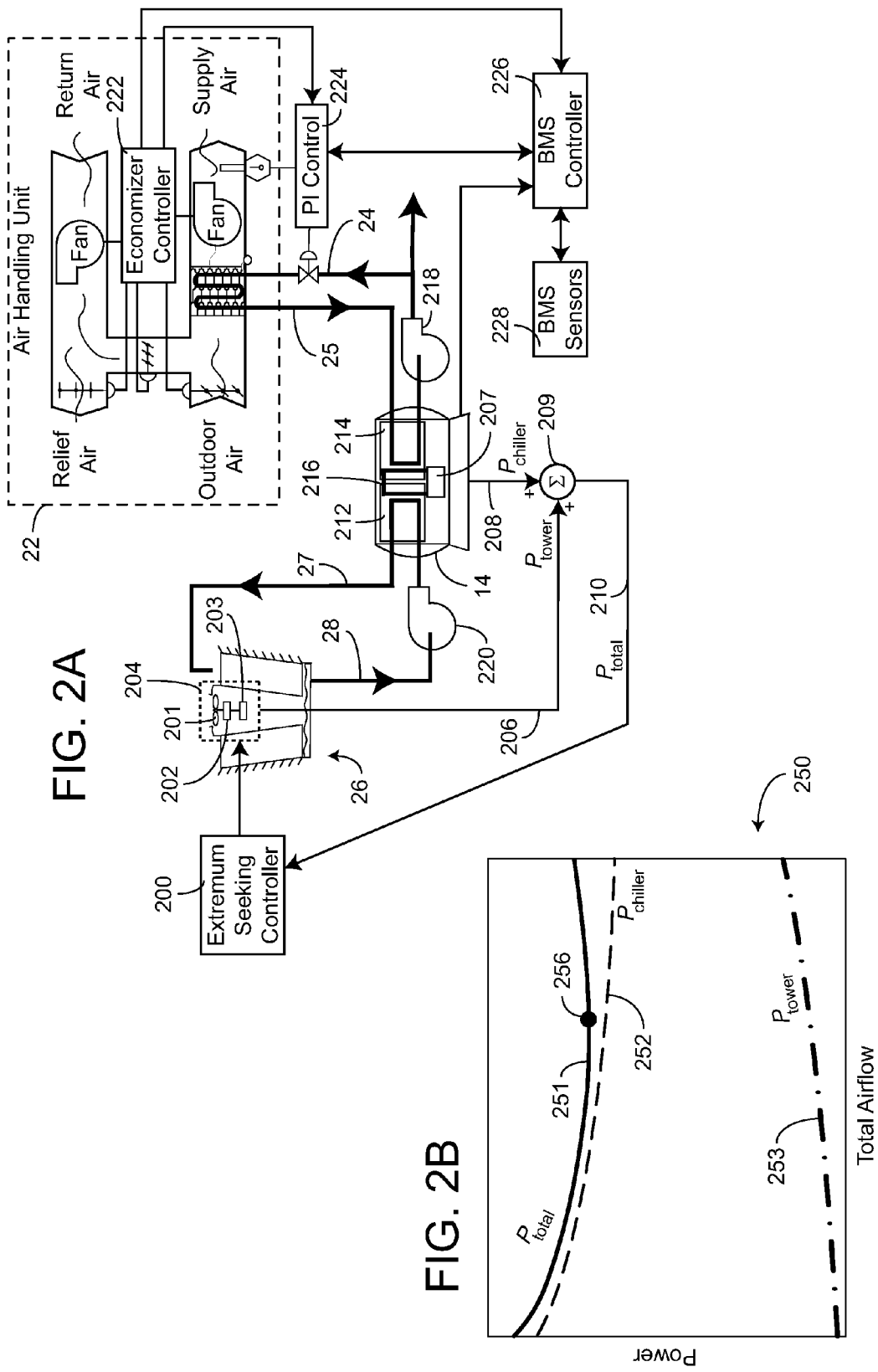

CONTROL OF COOLING TOWERS FOR CHILLED FLUID SYSTEMS

BACKGROUND

The present invention relates generally to the field of chilled fluid systems. The present invention more particularly relates to systems and methods for controlling cooling towers for chilled fluid systems.

Increasing cooling tower airflow provides a cooler condenser fluid temperature. Cooler condenser fluid can reduce the power expended by a chiller that uses the condenser fluid. Increasing cooling tower airflow, however, typically results in increased power consumption by the cooling tower fan system. It is challenging and difficult to control the cooling tower fan system such that the sum of the chiller power and the cooling tower fan system power is reduced.

SUMMARY

One embodiment of the invention relates to a system for controlling a cooling tower that cools condenser fluid for a condenser of a chiller. The system includes a cooling tower fan system that controllably varies a speed of at least one fan motor. The system further includes an extremum seeking controller that receives inputs of power expended by the cooling tower fan system and of power expended by the chiller. The extremum seeking controller provides an output to the cooling tower fan system that controls the speed of the at least one fan motor. The extremum seeking controller determines the output by searching for a speed of the at least one fan motor that minimizes the sum of the power expended by the cooling tower fan system and the power expended by the chiller.

Another embodiment of the invention relates to a method for controlling a cooling tower that cools condenser fluid for a condenser of a chiller. The method includes receiving, at an extremum seeking controller, an input of power expended by a cooling tower fan system. The method further includes receiving, at an extremum seeking controller, an input of power expended by the chiller. The method also includes determining, using the extremum seeking controller, a control signal representative of the speed of at least one fan motor for the cooling tower fan system.

Another embodiment of the invention relates to a device for controlling a cooling system having a cooling tower that cools condenser fluid for a chiller. The device includes an extremum seeking control module configured to seek a fan speed for the cooling tower that minimizes the power demand of the cooling system. The device further includes an output interface for outputting the fan speed for the cooling tower to the cooling system.

Alternative exemplary embodiments relate to other features and combinations of features as may be generally recited in the claims.

BRIEF DESCRIPTION OF THE FIGURES

The disclosure will become more fully understood from the following detailed description, taken in conjunction with the accompanying figures, wherein like reference numerals refer to like elements, in which:

FIG. 2A is a block diagram of the HVAC system of FIG. 1, according to an exemplary embodiment;

FIG. 2B is a graph of the action of the extremum seeking controller of FIG. 2A, according to an exemplary embodiment;

DETAILED DESCRIPTION OF THE EXEMPLARY EMBODIMENTS

Referring generally to the Figures, systems and methods are shown for controlling a cooling tower. The systems and methods utilize an extremum seeking controller to controllably vary the speed of at least one fan motor for the cooling tower. The extremum seeking controller determines the speed of the fan motor by searching for a speed of the fan motor that minimizes the sum of the power expended by the cooling tower fan system and the power expended by the chiller.

Figure 1:
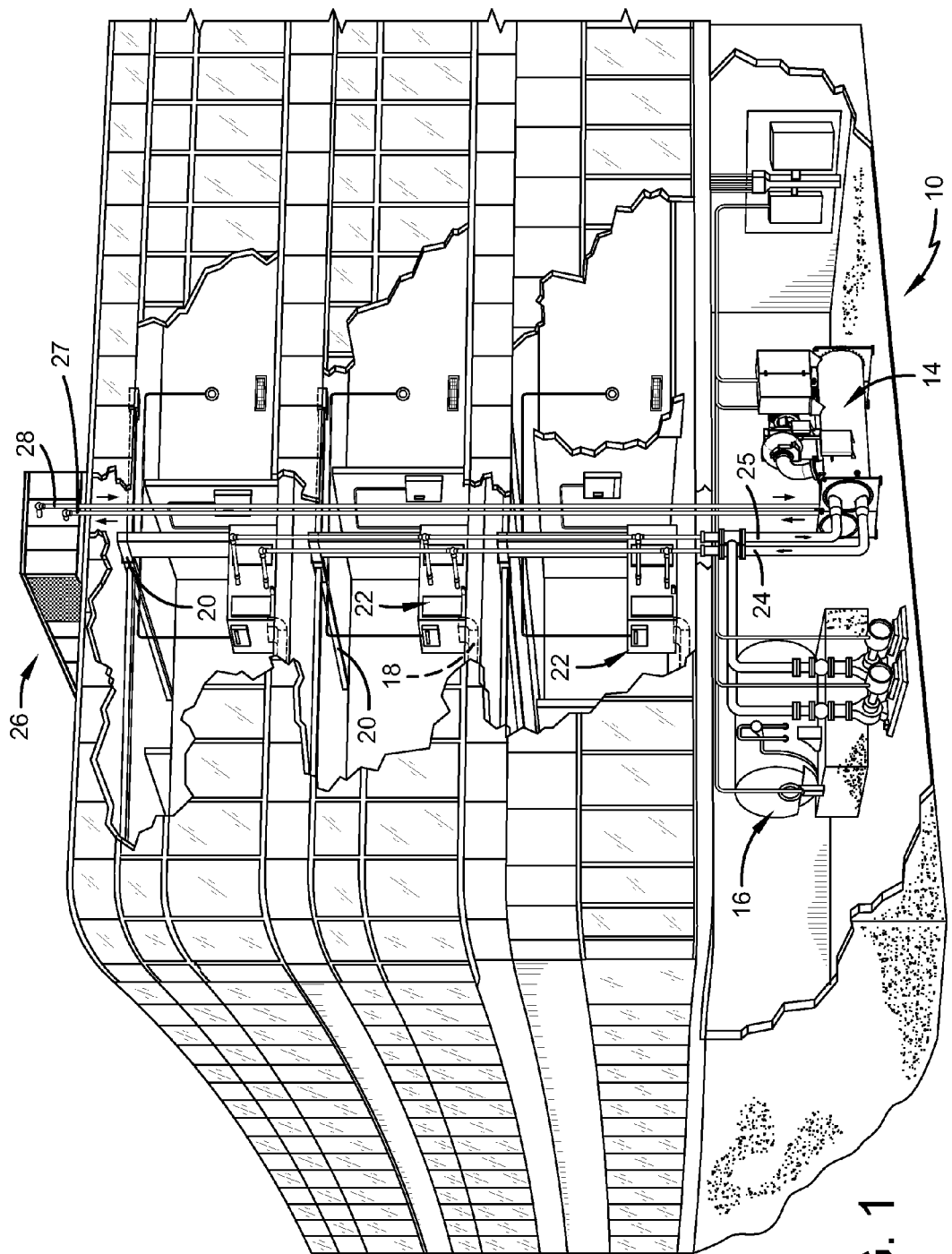
FIG. 1 is a perspective view of a building with a heating, ventilation, and air conditioning (HVAC) system, according to an exemplary embodiment.

Referring to FIG. 1, a perspective view of a building 10 is shown. The illustration of building 10 includes a cutaway view of an exemplary heating, ventilation, and air conditioning system (HVAC) system. The HVAC system shown in FIG. 1 uses a chilled fluid to remove heat from building 10. The chilled fluid is placed in a heat exchange relationship with the cooling load from the building, usually warm air, via a plurality of air handling units 22. During the heat exchange with the cooling load in air handling units 22, the chilled fluid receives heat from the load (i.e., warm air) and increases in temperature, removing heat from the load (e.g., air passed over piping in fan coil units, air handling units, or other air conditioning terminal units through which the chilled fluid flows). The resulting load (e.g., cooled air) is provided from air handling units 22 to building 10 via an air distribution system including air supply ducts 20 and air return ducts 18. The HVAC system shown in FIG. 1 includes a separate air handling unit 22 on each floor of building 10, but components such as air handling unit 22 or ducts 20 may be shared between or among multiple floors. Boiler 16 can add heat to the air passing through air handling units 22 when conditions exist to warrant heating.

The chilled fluid is no longer chilled after receiving heat from the load in air handling units 22. To re-chill the fluid for recirculation back to the air-handling units, the fluid is returned to a chiller 14 via piping 25. Within chiller 14, the fluid is placed in a heat exchange relationship with another cooling fluid, usually a refrigerant, in the chiller's heat exchanger (e.g., an evaporator). The refrigerant in the chiller's evaporator removes heat from the chilled fluid during the evaporation process, thereby cooling the chilled fluid. The chilled fluid is then circulated back to the air handling units 22 via piping 24 for subsequent heat exchanged with the load, and the cycle repeats.

The refrigerant in chiller 14 that absorbs heat from the chilled fluid changes from a boiling liquid and vapor state to vapor in the evaporator. The vapor is sucked or flows into a compressor of chiller 14 where a the compressor's rotating impeller (or another compressor mechanism such as a screw compressor, scroll compressor, reciprocating compressor, centrifugal compressor, etc.) increases the pressure and temperature of the refrigerant vapor and discharges it into the condenser. The condensed refrigerant drains from the condenser into a return line where a variable orifice (e.g., variable expansion valve) meters the flow of liquid refrigerant to the evaporator to complete the refrigerant circuit. In the embodiment of FIG. 1, water (or another chilled fluid) flows through tubes in the condenser of the chiller 14 to absorb heat from the refrigerant vapor and causes the refrigerant to condense. The water flowing through tubes in the condenser is pumped from the chiller 14 to a cooling tower 26 via piping 27. The cooling tower 26 utilizes fan driven cooling of the water or fan driven evaporation of the water to remove heat from the water delivered to cooling tower 26 via piping 27. The water cooled by cooling tower 26 is provided back to chiller 14's condenser via piping 28.

Referring now to FIG. 2A, a block diagram of the HVAC system of FIG. 1 is shown, according to an exemplary embodiment. In the diagram of FIG. 2, the HVAC system is shown to include an extremum seeking controller 200. Extremum seeking controller 200 is configured to control the speed of fan 201 by providing a control signal to fan motor 202 or to a variable speed drive 203 associated with fan motor 202. Throughout this application, any reference to controlling the speed of the cooling tower fan can be or include controlling the speed of the fan motor, providing an appropriate control signal to the fan motor's variable speed drive, or any other control activity that affects the cooling tower fan speed of cooling tower system 204.

Extremum seeking controller 200 determines the fan speed by searching for a fan speed (e.g., an optimum fan speed) that minimizes the sum of the power expended by the cooling tower fan system 204 and the power expended by the chiller 14 (e.g., power expended by the chiller's compressor). The action of the extremum seeking controller 200 can be explained with reference to FIG. 2B. The power demand of the chiller's compressor (and/or other components) is affected by the condenser water supply temperature—the temperature of the water supplied by cooling tower 26 via piping 28. Increasing the air flow of the cooling tower 26 (e.g., increasing the fan speed) provides a lower condenser water temperature, which reduces the chiller's power requirement (primarily the power expended by the chiller's compressor). Increasing the fan speed, however, causes an increase in tower fan power consumption. There is an optimal cooling tower air flow rate 256 that minimizes the sum 251 of the expended chiller power 252 and the power 253 expended by the cooling tower fan system 204.

Referring back to FIG. 2A, extremum seeking controller 200 receives an input 206 of power expended by the cooling tower fan system 204 and an input 208 of power expended by chiller 14 (e.g., chiller 14's compressor 207). Extremum seeking controller 200 implements an extremum seeking control strategy that dynamically searches for an unknown input (e.g., optimal tower fan speed) to obtain system performance (e.g., power expended by the cooling tower and the chiller) that trends near optimal. Extremum seeking controller 200 operates by obtaining a gradient of process system output (e.g., power expended by the cooling tower and the chiller) with respect to process system input (fan speed) by slightly perturbing or modulating the fan speed and applying a demodulation measure to the output. Extremum seeking controller 200 provides control of the process system (e.g., the fan speed and therefore the tower and chiller power demand) by driving the obtained gradient toward zero using an integrator or another mechanism for reducing a gradient in a closed-loop system.

As illustrated in FIG. 2A, inputs 206 and 208 may be summed outside of extremum seeking controller 200 via summing block 209 to provide combined signal 210 (e.g., which may be representative of total power demand of tower fan system 204 and chiller 14). In various other embodiments, extremum seeking controller 200 conducts the summation of summing block 209. In either case, extremum seeking controller 200 can be said to receive inputs 206 and 208 (even if inputs 206 and 208 are provided as a single summed or combined signal 210).

Referring still to FIG. 2A, chiller 14 is shown as a simplified block diagram. Particularly, chiller 14 is shown to include condenser 212, evaporator 214, refrigerant loop 216, and compressor 207. Chiller 14 also includes at least one expansion valve on refrigerant loop 216 between condenser 212 and evaporator 214. Chiller 14 can also include any number of sensors, control valves, and other components that assist the refrigeration cycle operation of chiller 14.

Chilled fluid pump 218 pumps the chilled fluid through the loop that runs through the building (e.g., through piping 24 and 25, through chiller 14, and to one or more air handling units 22). In the embodiment shown in FIG. 2A, the chilled fluid is supplied via piping 24 to an air handling unit 22 that is an economizer type air handling unit. Economizer type air handling units vary the amount of outdoor air and return air used by the air handling unit for cooling. Air handling unit 22 is shown to include economizer controller 222 that utilizes one or more algorithms (e.g., state based algorithms, extremum seeking control algorithms, etc.) to affect the actuators and dampers or fans of air handling unit 22. The flow of chilled fluid supplied to air handling unit 22 can also be variably controlled and is shown in FIG. 2A as being controlled by PI control 224. PI control 224 can control the chilled fluid flow to air handling unit 22 to achieve a setpoint supply air temperature. Economizer controller 222, a controller for chiller 14, and PI control 224 can be supervised by one or more building management system (BMS) controllers 226.

A BMS controller is, in general, a computer-based system configured to control, monitor, and manage equipment in or around a building or building area. A BMS controller may include a METASYS building controller or other devices sold by Johnson Controls, Inc. The BMS controller may provide one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with the BMS, its subsystems, and devices. For example, BMS controller 226 may provide a web-based graphical user interface that allows a user to set a desired setpoint temperature for a building space. BMS controller 226 can use BMS sensors 228 (connected to BMS controller 226 via a wired or wireless BMS or IT network) to determine if the setpoint temperatures for the building space are being achieved. BMS controller 226 can use such determinations to provide commands to PI control 224, chiller 14, economizer controller 222, or other components of the building's HVAC system.

In an exemplary embodiment, extremum seeking controller 200 does not receive control commands from BMS controller 226 or does not base its output calculations on an input from BMS controller 226. In other exemplary embodiments extremum seeking controller 200 receives information (e.g., commands, setpoints, operating boundaries, etc.) from BMS controller 226. For example, BMS controller 226 may provide extremum seeking controller 200 with a high fan speed limit and a low fan speed limit. A low limit may avoid frequent component and power taxing fan start-ups while a high limit may avoid operation near the mechanical or thermal limits of the fan system.

While extremum seeking controller 200 is shown as separate from BMS controller 226, extremum seeking controller 200 may be integrated with BMS controller 226. For example, extremum seeking controller 200 may be a software module configured for execution by a processor of BMS controller 226. In such an embodiment, the inputs of expended chiller power 208 and tower system fan power 206 may be virtual inputs. For example, software executed by BMS controller 226 may use model-based calculations to determine the expended power. The models may relate, for example, fan speed to power expended by cooling tower fan system 204 and, for example, compressor pump speed to power expended by chiller 14. In yet other exemplary embodiments the inputs of expended power may be "real" (e.g., a current sensor coupled to the power input of variable speed drive 203 of cooling tower fan system 204 may be wired to an input of extremum seeking controller 200, summing element 209, or BMS controller 226, and a current sensor coupled to the power input of the variable speed compressor motor may be wired to another input of extremum seeking controller 200, summing element 209, or BMS controller 226).

In the embodiment shown in FIG. 2A, where air handling unit 22 is an economizer, one or more additional extremum seeking controllers may be used to provide for control of air handling unit 22 during one or more of the operational states of the economizer. For example, economizer controller 222 may include an extremum seeking controller or control module configured to utilize an extremum seeking control strategy to change the position of one or more outdoor air actuators or dampers. Accordingly, in addition to extremum seeking controller 200 configured to control fan control system 204 via an extremum seeking control strategy, some embodiments of FIG. 2A may also implement the extremum seeking control systems or methods described in one or more of U.S. application Ser. No. 11/699,589, filed Jan. 30, 2007, U.S. application Ser. No. 11/699,860, filed Jan. 30, 2007, U.S. application Ser. No. 12/323,293, filed Nov. 25, 2008, U.S. application Ser. No. 12/683,883, filed Jan. 7, 2010, and U.S. application Ser. No. 12/650,366, filed July 16; each of which is hereby incorporated by reference.

Figure 2C:
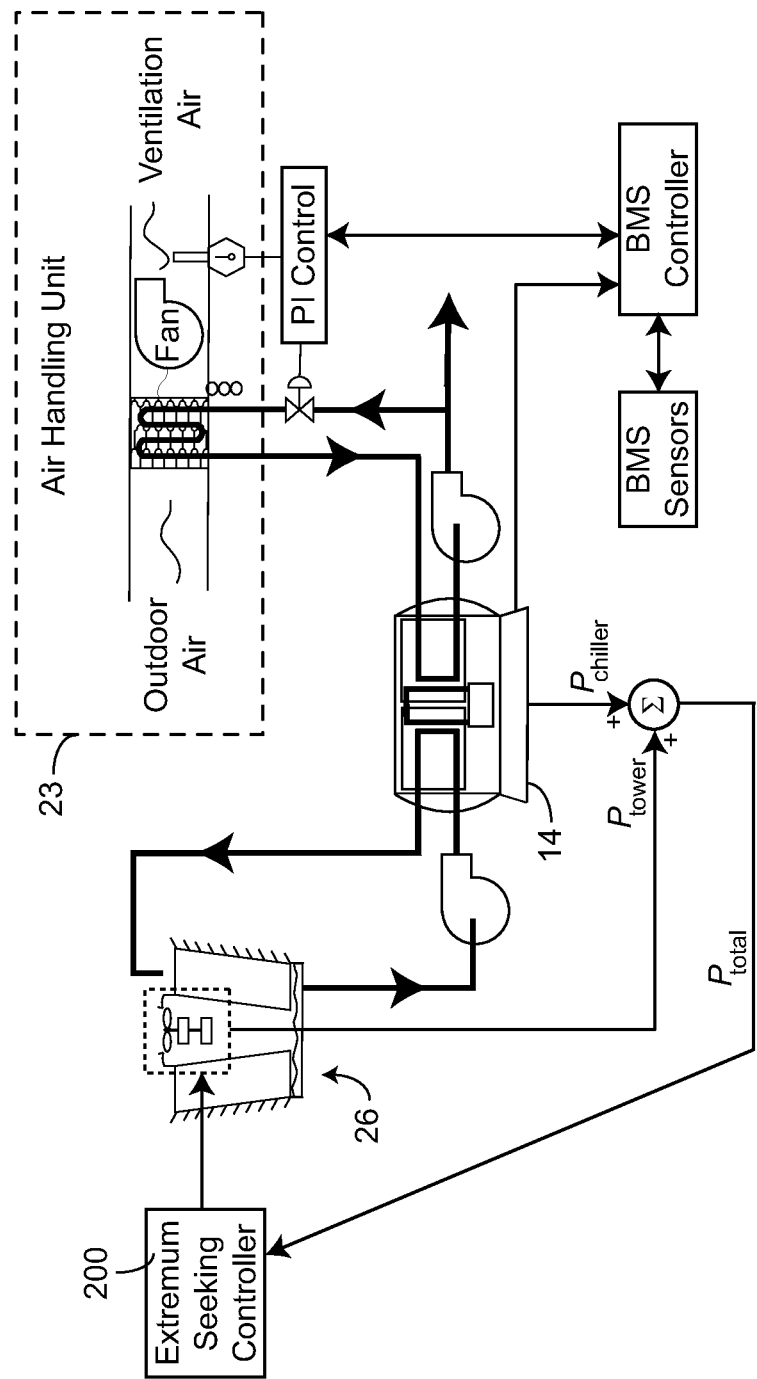
FIG. 2C is a block diagram of an HVAC system including an air handling unit that is not an economizer, according to an exemplary embodiment.

In FIG. 2C, the chilled fluid from chiller 14 is provided to an air handling unit 23 that is not an economizer or does not have an economizer. While two different types of air handling units 22 and 23 have been shown in FIGS. 2A and 2C, respectively, any other type of air handling unit may be utilized with chilled fluid provided by chiller 14. Further, in various alternative embodiments, chiller 14 provides chilled fluid to other loads (refrigeration cases, industrial cooling systems, etc.). Yet further, in varying other alternative embodiments, cooling tower 26 operates to provide cooled water or fluid to a device other than a chiller. For example, in some alternative embodiments the cooled water or fluid affected by cooling tower 26 as controlled by extremum seeking controller 200 may be directly utilized for industrial cooling, retail refrigeration unit cooling, commercial refrigeration unit cooling, or in any other application where the power expended by another device or system such as chiller 14 varies depending on the speed of a cooling tower fan.

Referring back to FIG. 2A, water pump 220 pumps the water from cooling tower 26 through piping 28, through chiller 14, and back to cooling tower 26 via piping 27. Pump 220 may be a fixed speed pump or a variable speed pump.

Figure 3A:
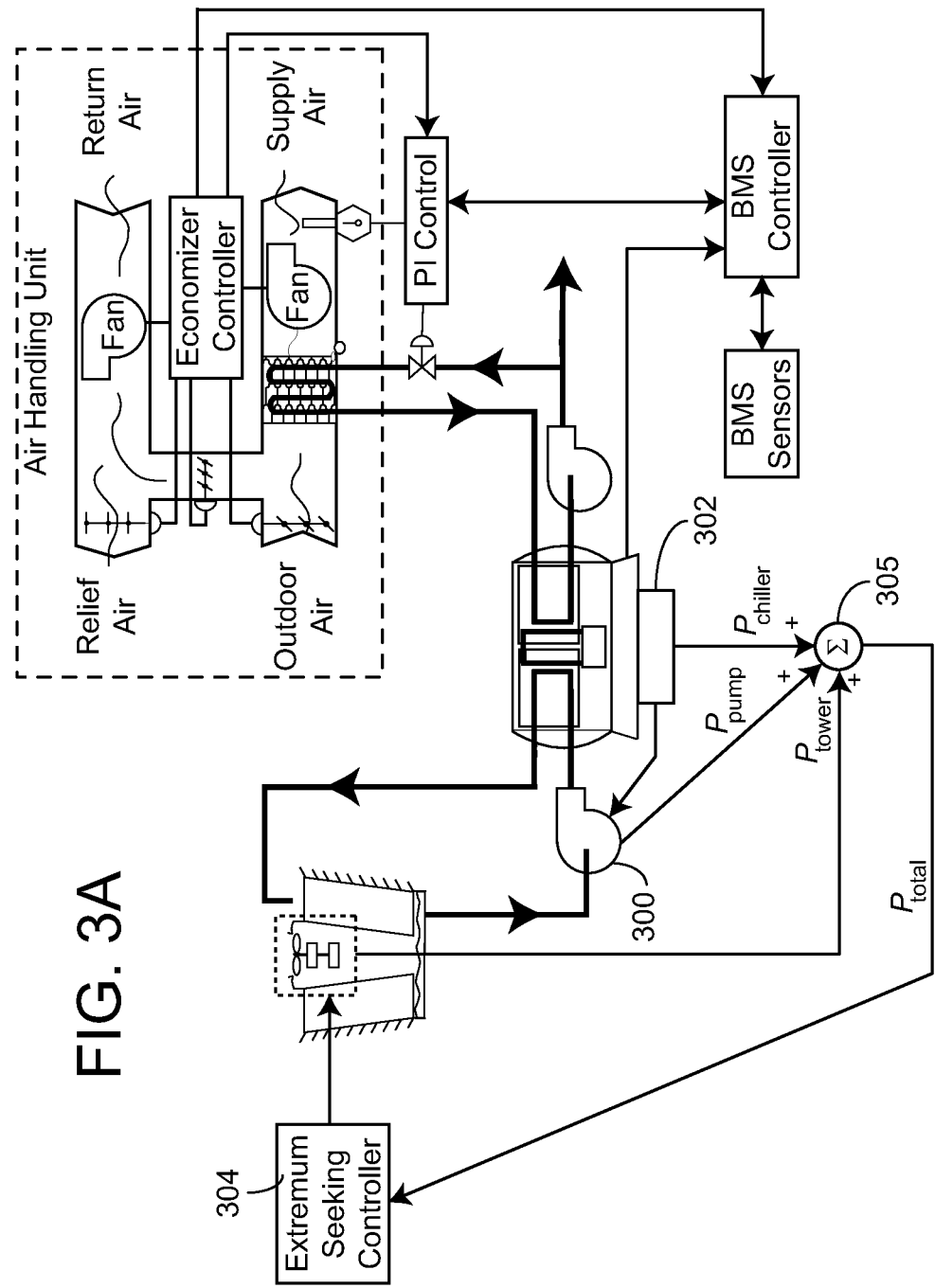
FIG. 3A is a block diagram of an alternative HVAC system wherein condensing water pump is of variable speed, according to an exemplary embodiment.
Figure 3B:
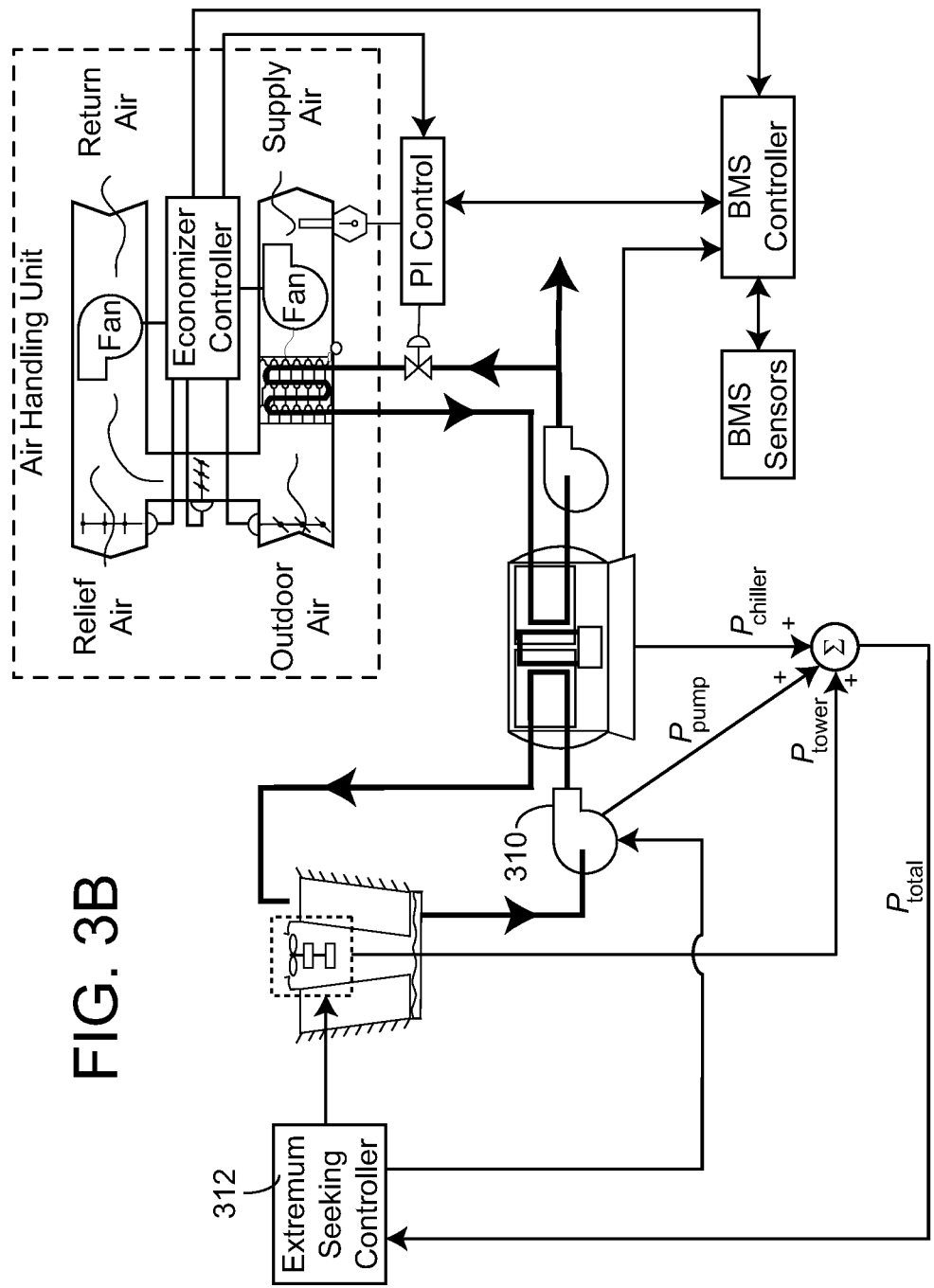
FIG. 3B is a block diagram of an alternative HVAC system wherein condensing water pump is of variable speed and is also controlled by the extremum seeking controller, according to another exemplary embodiment.

FIGS. 3A and 3B illustrate two alternative embodiments wherein condensing water pumps 300, 310 are variable speed pumps. Variable speed pumps 300, 310 are controllably varied by the extremum seeking controller or the chiller's controller. In FIG. 3A, variable speed water pump 300 is variably controlled by chiller controller 302. Chiller controller 302 varies the speed of pump 300 to change the amount of heat removed from the refrigerant in the chiller's condenser. The power expended by pump 300 will increase as pump speed increases but the power expended by the chiller's compressor may generally increase as the speed of pump 300 decreases. Extremum seeking controller 304 can be configured to receive an input of power expended by water pump 300 in addition to its other inputs. Accordingly, and in the embodiment shown in FIG. 3A, extremum seeking controller 304 modifies the fan speed of at least one cooling tower fan by searching for a fan speed that minimizes the sum of $P_{pump}$, $P_{chiller}$, and $P_{tower}$. Receiving an input of power expended by water pump 300 at extremum seeking controller 304 can describe receiving a separate input at extremum seeking controller 304, can describe summing $P_{pump}$ with $P_{chiller}$, and $P_{tower}$ at summation block 305, or an describe another combination of inputs for reception at extremum seeking controller 304.

In FIG. 3B, water pump 310 is also controlled by extremum seeking controller 312. Accordingly, extremum seeking controller 312 controls both the fan speed of the cooling tower and the speed of water pump 310. Extremum seeking controller 312 uses the inputs of $P_{pump}$, $P_{chiller}$, and $P_{tower}$ to search for a fan speed and a pump speed that minimize the sum of $P_{pump}$, $P_{chiller}$, and $P_{tower}$. Extremum seeking controller 312 is further described below with reference to FIG. 7.

Figure 4:
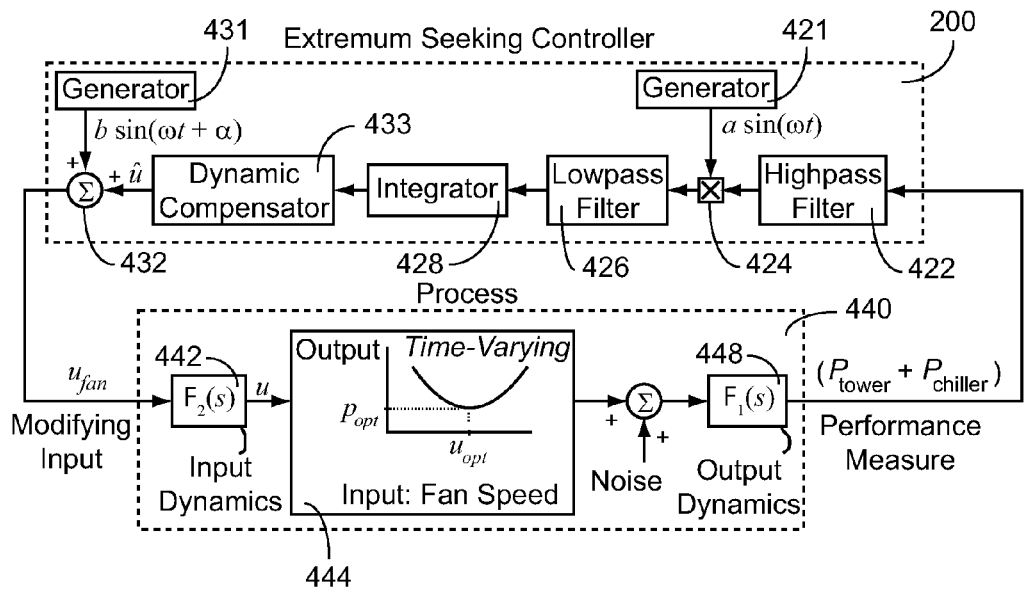
FIG. 4 is a detailed diagram of the extremum seeking controller of FIG. 2A, according to an exemplary embodiment.

FIG. 4 is a detailed diagram of extremum seeking controller 200 shown in FIG. 2A. In FIG. 4, extremum seeking controller 200 determines a performance gradient through the use of high pass filter 422, a demodulation signal provided by generator 421, and a dither signal provided by generator 431. Integrator 428 is used to drive the performance gradient to zero in order to attempt to optimize the closed loop system created by extremum seeking controller 200 and process system 440 (i.e., the cooling tower and the chiller). In FIG. 4, process system 440 is represented mathematically as a combination of input dynamics 442, performance map 444, and output dynamics 448. Mathematically, input dynamics 442 provides a function signal u to nonlinear and/or time varying performance map 444. The output of performance map 444 is affected by output dynamics 448 to result in an output of $P_{tower}+P_{chiller}$. Extremum seeking controller 420 seeks to find a value for $u_{fan}$ that minimizes the output of performance map 444, thereby also minimizing output signal $P_{tower}+P_{chiller}$. As an illustrative example, $P_{tower}+P_{chiller}$ may be represented by the expression $(P_{tower}+P_{chiller})=p(u_{fan})=k*(u_{fan}-u_{opt})^2+P_{min}$ where $p(u_{fan})$ represents the performance map and $u_{opt}$ represents the fan speed value at which p(u) is minimized; k is a constant for converting the control signal terms of $(u_{fan}-u_{opt})^2$ to power (e.g., in watts); $P_{min}$ is a minimum for the power expended by the tower. $P_{tower}+P_{chiller}$ is received by extremum seeking controller 200. The performance gradient signal is produced by perturbing the system (e.g., using generator 431 to add a dither signal to the ESC loop at processing element 432). While the dither signal shown in FIG. 4 is sinusoidal, generator 431 could modulate or perturb the fan speed signal using a staircase signal, a square wave, a step signal, or otherwise. Input signal $(P_{tower}+P_{chiller})$ (i.e., the performance measure) is used to detect the performance gradient through the use of a demodulation signal provided by generator 421 and that is a counterpart to the modulation signal. In the embodiment shown in FIG. 4, the demodulation signal acts on (e.g., is multiplied by) the output of high-pass filter 422 at processing element 424. A low pass filter 426 is used to remove high frequency noise from the signal provided to integrator 428. As described above, the performance gradient is a function of the difference between $u_{fan}$ and $u_{opt}$. The gradient signal is provided as an input to integrator 428 to attempt to drive the gradient to zero. A dynamics compensator 433 may be included in extremum seeking controller 200 to slow the rate of change of integrator 428's output. In other embodiments dynamics compensator 433 may be absent from extremum seeking controller 200.

Figure 5:
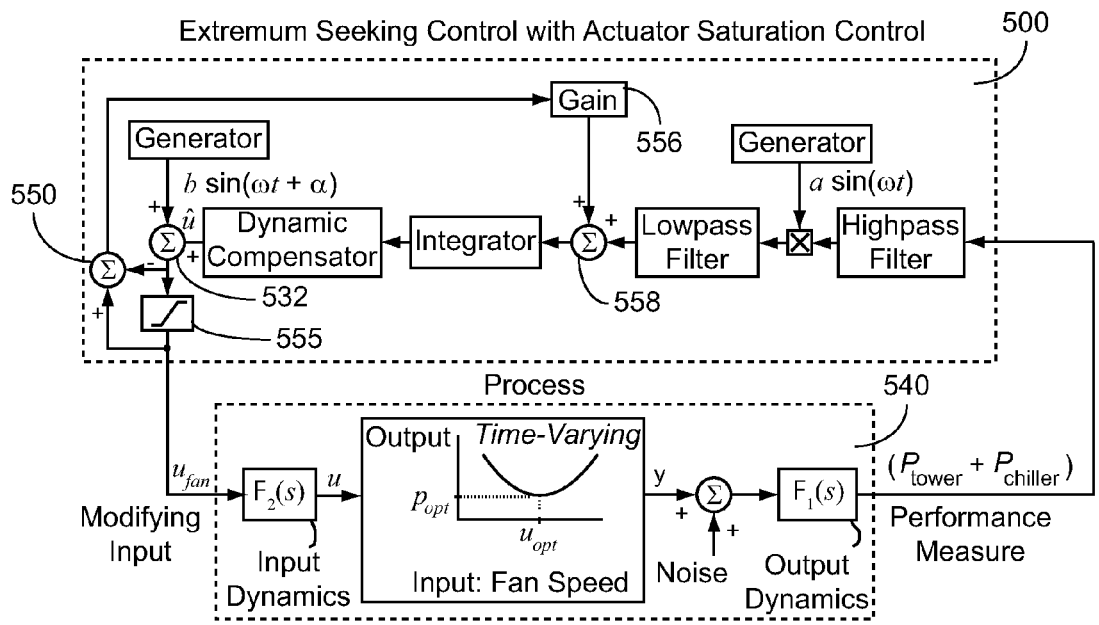
FIG. 5 is a detailed diagram of an extremum seeking controller that may be used in place of the extremum seeking controller of FIG. 2A, according to an exemplary embodiment.

FIG. 5 is a detailed diagram of an extremum seeking controller 500 that may be used in place of extremum seeking controller 200 shown in FIG. 2A, according to another exemplary embodiment. Extremum seeking controller 500 includes an actuator saturation control feature. In the embodiment shown in FIG. 5, a feedback loop is used to limit the effects of an actuator saturation condition. At limiter 555 (e.g., a limiter calculation module, a bandpass filter, etc.) upper or lower limits for the fan speed may be set. Signals from block 532 that are outside of the upper or lower limits are limited and provided as fan speed output $u_{fan}$. The output of limiter 555 is also provided to block 550 which computes the difference between the signal $u_{fan}$ sent to the fan and the output from block 532. In an alternative embodiment, an indication of actual fan speed (e.g., from a separate fan speed controller, from a sensor, from the fan motor, etc.) is provided back to block 550 rather than an output from a limiter. The difference signal provided by block 550 is amplified by a gain 556 and added to the input of the extremum seeking controller's integrator at processing element 558. This design limits the input to the integrator, preventing the input from winding up or entering an actuator saturation condition. Additional details regarding this actuator saturation control feature are described in U.S. application Ser. No. 12/683,883.

Figure 6:
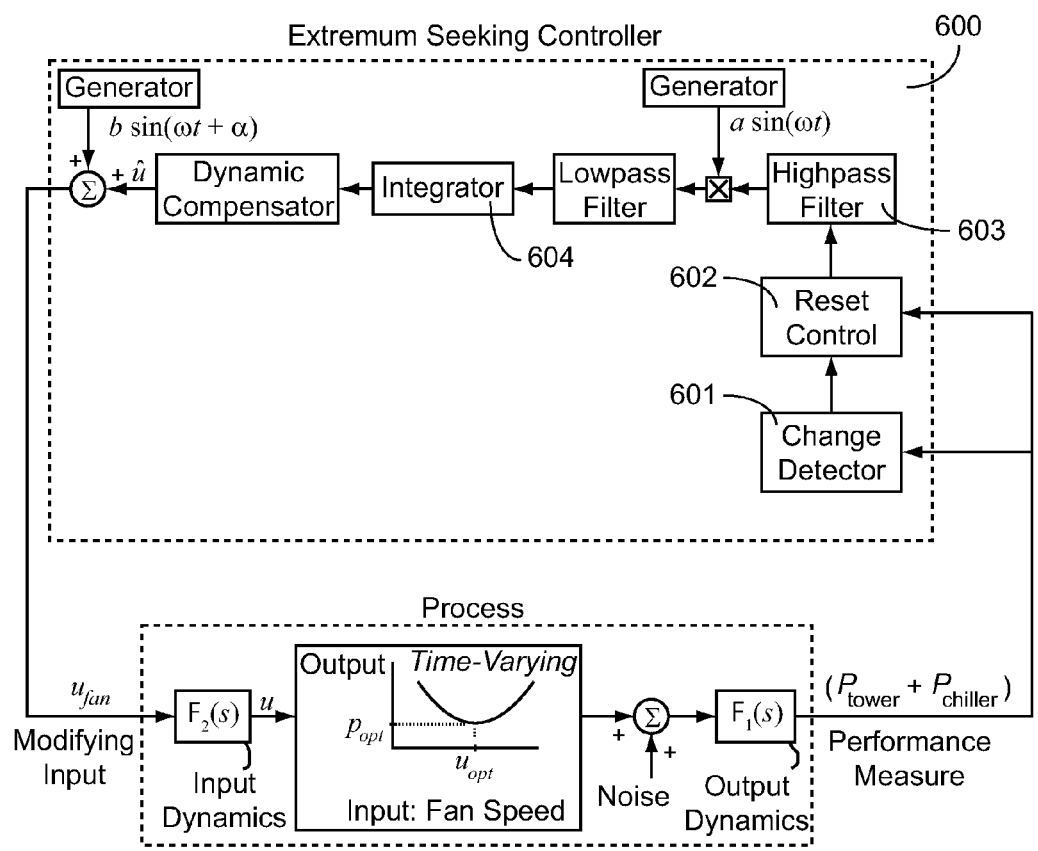
FIG. 6 is a detailed diagram of another extremum seeking controller that may be used in place of the extremum seeking controller of FIG. 2A, according to another exemplary embodiment.

FIG. 6 is a detailed diagram of another extremum seeking controller 600 that may be used in place of extremum seeking controller 200 shown in FIG. 2A, according to another exemplary embodiment. Extremum seeking controller 600 is configured to limit the effects of an abrupt change in the operation of the process system. Extremum seeking controller 600 includes a change detector 601 and a reset control 602. Extremum seeking controller 600 functions the same as the extremum seeking controller 200 detailed in FIG. 4 when an abrupt change in the operation of the cooling tower fan system or chiller has not occurred. Change detector 601 monitors $(P_{tower}+P_{chiller})$ or the parameters $P_{tower}$ and $P_{chiller}$ individually. If change detector 601 detects an abrupt change in the operation of the cooling tower fan system and/or chiller, change detector 601 provides a signal that enables reset control 602. In an exemplary embodiment, reset control 602 forces a reset parameter to high-pass filter 603 for a variable or set amount of time in order to compensate for the abrupt change in the operation of the process system. Forcing a reset parameter to high-pass filter 603 effectively changes the performance gradient acted upon by extremum seeking controller 600 and can significantly reduce the amount of time necessary for extremum seeking controller 600 to adapt to abrupt changes in the operation of the process system. In an exemplary embodiment, the reset parameter can be a value such as a previous average fan speed, a "medium" fan speed, a maximum fan speed, or another fan speed that is not expected to cause the system to immediately attempt to adapt to the abrupt change in the process system. Integration of the altered performance gradient is then performed by integrator 604 and the resulting manipulated variable (the fan speed) is passed on to the cooling tower fan system. If the abrupt change in the process system is momentary (e.g., a spike in chilling system power due to bringing turning the cooling system on, a spike in chilling system power due to an abruptly changed setpoint, etc.) holding the reset parameter for a few minutes rather than utilizing the actual performance parameter may allow extremum seeking controller 600 to avoid overshoot or oscillation once the momentary condition subsides. In an alternative embodiment, reset control 602 forces extremum seeking controller 600 to turn off and then on again after an abrupt change is detected by change detector 601. Such a strategy may be advantageous where the abrupt changes are expected to be normal and sustained rather than momentary. Additional details regarding various reset control features for use with an extremum seeking control are described in U.S. application Ser. No. 12/650,366.

Figure 7:
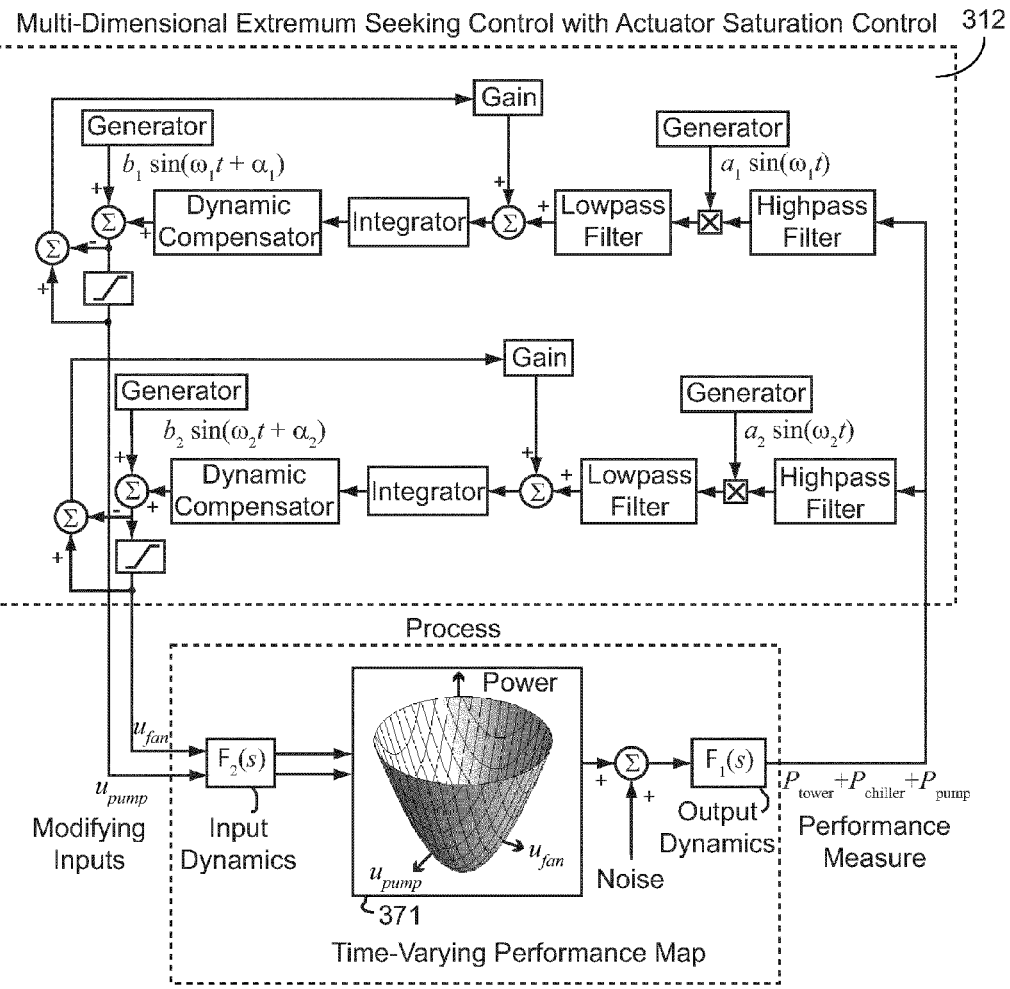
FIG. 7 is a detailed diagram of the multi-variable extremum seeking controller of FIG. 3B, according to an exemplary embodiment.

FIG. 7 is a detailed diagram of the multi-variable extremum seeking controller 312 shown in FIG. 3B, according to an exemplary embodiment. Extremum seeking controller 312 seeks to optimize fan speed $u_{fan}$ and condenser pump speed $u_{pump}$ to minimize total system energy usage $(P_{tower}+P_{chiller}+$ $P_{pump}$). In other words, extremum seeking controller seeks to find a minimum point on a theoretical three dimensional performance map 371 by perturbing both fan speed and pump speed signals. Accordingly, extremum seeking controller 312 includes a first extremum seeking control portion for seeking optimum $u_{fan}$ values and a second extremum seeking control portion for seeking optimum $u_{pump}$ values. According to one embodiment, the single or multi-variable fault detection features described in U.S. application Ser. No. 12/323,293 can be used with the extremum seeking controller 312 or with the other extremum seeking controllers described herein. Further, as shown in FIG. 7, limiter blocks are provided to both extremum seeking portions. In other embodiments one extremum seeking control portion may include the actuator saturation control of FIG. 5 while another extremum seeking control portion includes the reset control described above with respect to FIG. 6. In yet other embodiments each extremum seeking control includes an actuator saturation control feature of FIG. 5 and a reset control feature as shown in FIG. 6.

Figure 8A:
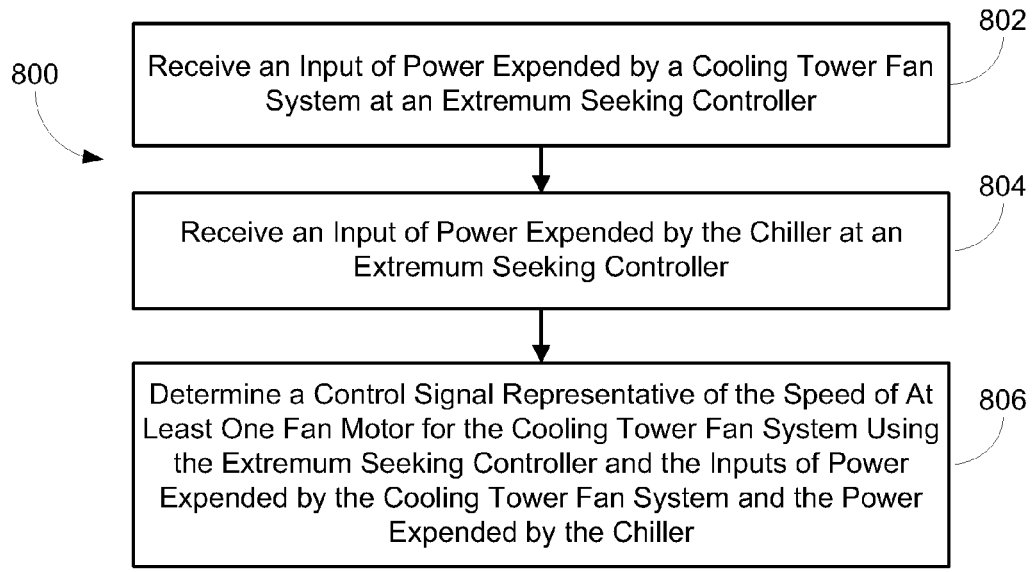
FIG. 8A is a flow chart of a process for controlling a cooling tower that cools condenser fluid for a condenser of a chiller, according to an exemplary embodiment.

Referring now to FIG. 8A, a flow chart of a process 800 for controlling a cooling tower that cools condenser fluid for a condenser of a chiller is shown, according to an exemplary embodiment. Process 800 includes receiving, at an extremum seeking controller, an input of power expended by a cooling tower fan system (step 802). Process 800 further includes receiving, at an extremum seeking controller, an input of power expended by the chiller (step 804). Process 800 further includes determining a control signal representative of the speed of at least one fan motor for the cooling tower fan system using the extremum seeking controller and the inputs of power expended by the cooling tower fan system and the power expended by the chiller (step 806). The process loops, continuously adjusting the fan speed to seek a minimum system power expenditure.

Figure 8B:
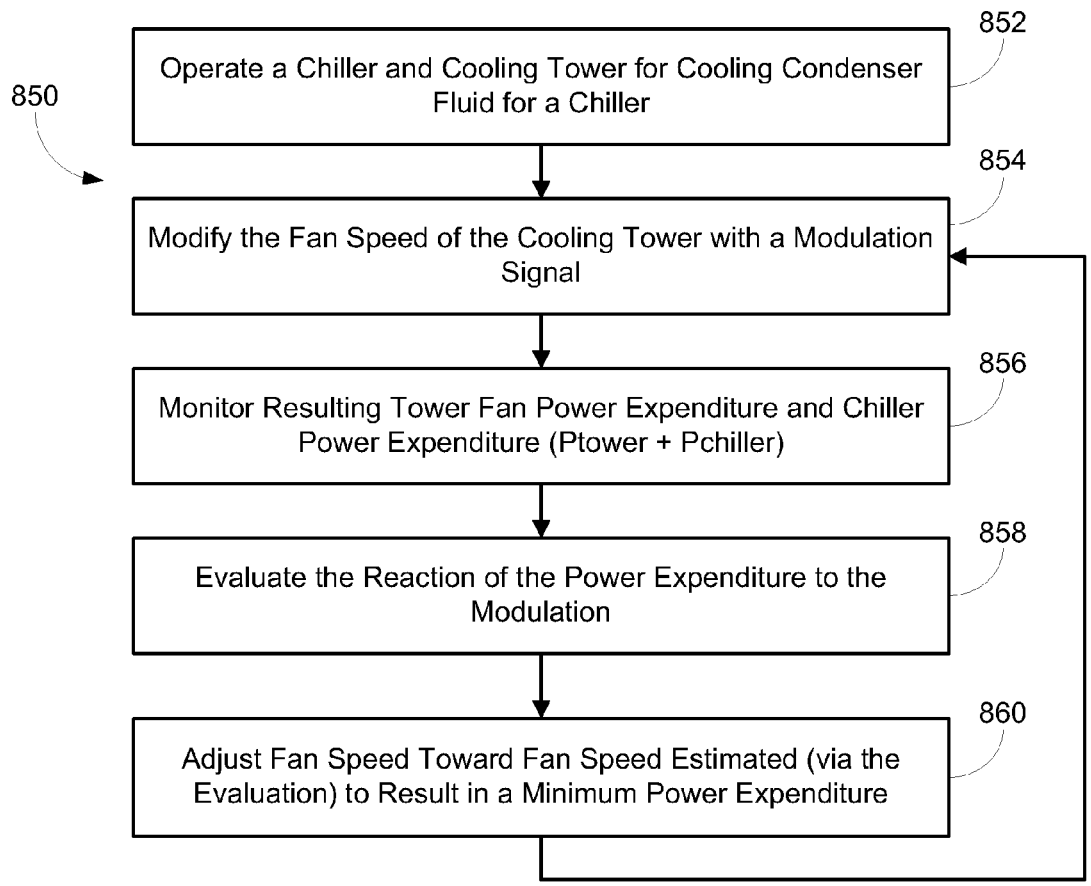
FIG. 8B is a more detailed flow chart of a process for controlling a cooling tower, according to an exemplary embodiment.

Referring now to FIG. 8B, a more detailed flow chart of a process 850 for controlling a cooling tower is shown, according to an exemplary embodiment. Process 850 includes operating a chiller and cooling tower for cooling condenser fluid for a chiller (step 852). Process 850 further includes modifying the fan speed of the cooling tower with a modulation signal (step 854). Process 850 further includes monitoring the resulting tower fan power expenditure and chiller power expenditure (step 856). Step 856 may include, for example, summing the power expenditure of the tower fan and chiller ($P_{tower}+P_{chiller}$). Process 850 further includes evaluating the reaction of the power expenditure to the modulation (step 858). Process 850 further includes adjusting a fan speed toward a fan speed estimated (via the evaluation of step 858) to result in a minimum power expenditure (step 860).

Figure 9:
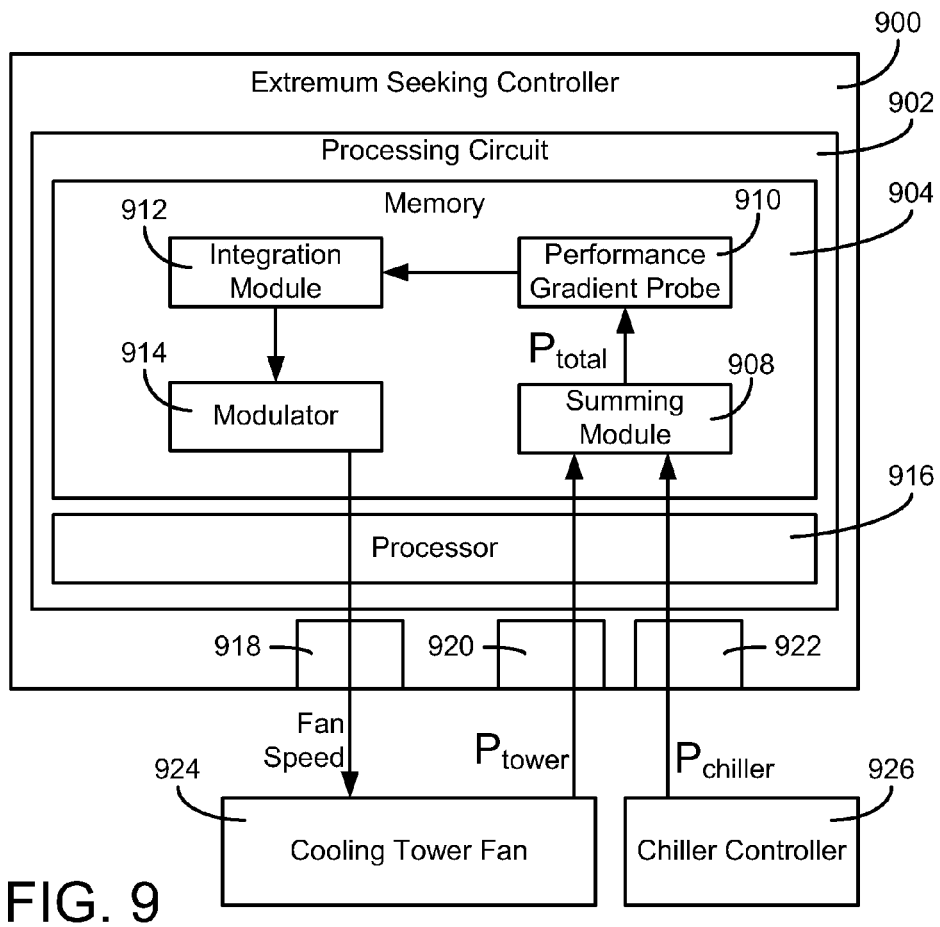
FIG. 9 is a block diagram of another extremum seeking controller for controlling fan speed of a cooling tower, according to an exemplary embodiment.

Referring now to FIG. 9, a block diagram of an extremum seeking controller for adjusting cooling tower airflow is shown, according to an exemplary embodiment. Extremum seeking controller 900 receives chiller power demand $P_{chiller}$ from chiller controller 926. Extremum seeking controller 900 includes a processing circuit 902 with a processor 916 and a memory device 904. According to an exemplary embodiment, processor 916 and/or all or parts of processing circuit 902 can be implemented as a general purpose processor, an application specific integrated circuit (ASIC), one or more field programmable gate arrays (FPGAs), a group of processing components, one or more digital signal processors, or other suitable electronics components. Memory 904 (e.g., memory unit, memory device, storage device, etc.) is one or more devices for storing data and/or computer code for completing and/or facilitating the various processes described in the present disclosure. Memory 904 may be or include volatile memory or non-volatile memory. Memory 904 may include database components, object code components, script components, or any other type of information structure for supporting the various activities described in the present disclosure. According to an exemplary embodiment, memory 904 is communicably connected to processor 916 via processing circuit 902 and includes computer code for executing (e.g., by processor 916) one or more processes described herein. Memory 904 may also include various data regarding the operation of one or more of the control loops relevant to the system (e.g., performance map data, historical data, behavior patterns regarding power usage, etc.). In an exemplary embodiment, the functions of the extremum seeking controllers described throughout this application are implemented as software within memory 904 of processing circuit 902.

Summing module 908 of extremum seeking controller 900 receives an input of power expended by cooling tower fan 924 ($P_{tower}$) and an input of power expended by the chiller associated with chiller controller 926 ($P_{chiller}$). The inputs are received via input interfaces 920, 922. Summing module 908 sums the power demand inputs and provides the sum ($P_{total}$) to performance gradient probe 910. Performance gradient probe 910 detects a difference between an estimated optimal fan speed for cooling tower fan 924 and the current fan speed. Integration module 912 is configured to attempt to minimize the gradient by producing a command signal to drive cooling tower fan 924 to a new fan speed. Modulator 914 receives the new command signal and adds a dither signal or other modulation component to the command signal (e.g., modulator 914 may have similar functionality to generator 431 of FIG. 4). The resulting modulated command signal (e.g., a fan speed) is then provided to cooling tower fan 924 via output interface 918.

Figure 10:
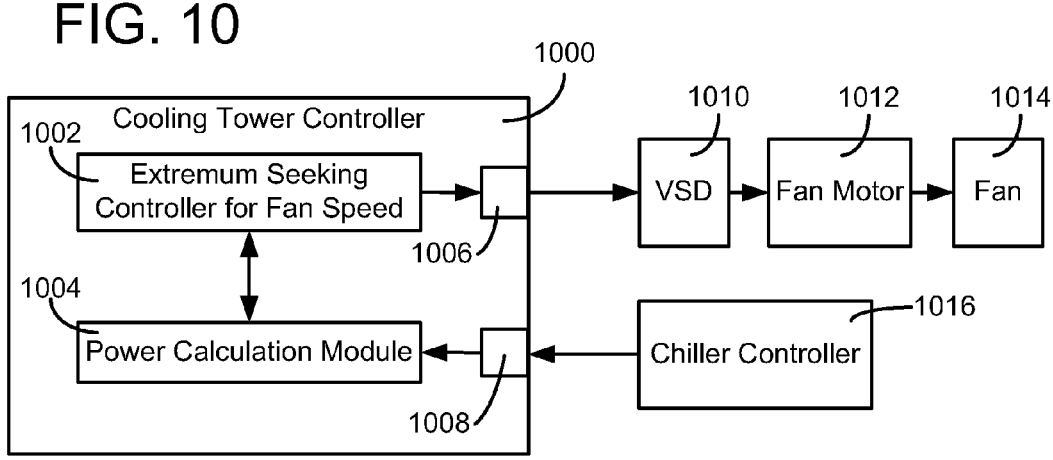
FIG. 10 is a block diagram of a cooling tower controller including an extremum seeking controller for adjusting the cooling tower air flow, according to an exemplary embodiment.

Referring now to FIG. 10, a block diagram of a cooling tower controller 1000 is shown, according to an exemplary embodiment. Cooling tower controller 1000 may receive an input representing chiller power demand from chiller controller 1016 via input interface 1008. In other embodiments chiller controller 1016 provides a different input such as compressor speed. A mathematical model may be used by power calculation module 1004 to convert the input received from chiller controller 1016 to chiller power demand $P_{chiller}$. Power calculation module 1004 provides $P_{chiller}$ to extremum seeking controller for determining a new fan speed 1002. In addition to determining $P_{chiller}$, power calculation module 1004 can also determine $P_{tower}$ based on, e.g., knowledge of actual fan speed. Extremum seeking controller 1002 uses the power calculation(s) as inputs to determine a new speed for fan 1014. Extremum seeking controller 1002 can implement the new fan speed by providing an appropriate control signal to variable speed drive (VSD) 1010 via output interface 1006. VSD 1010 adjusts the speed of fan motor 1012 which drives fan 1014.

Figure 11:
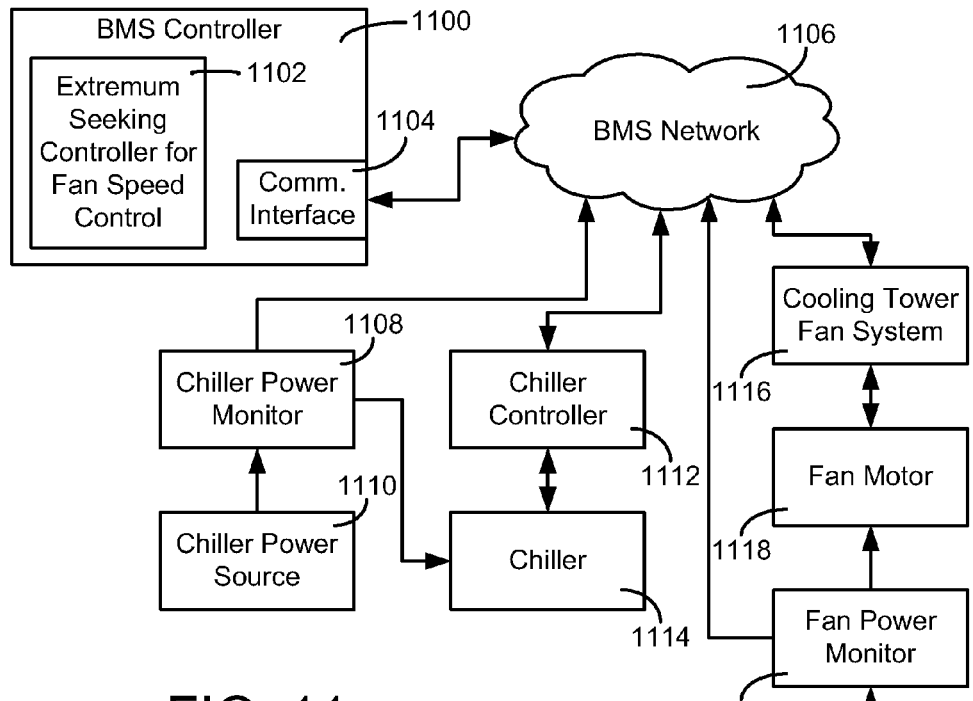
FIG. 11 is a block diagram of a building management system controller including an extremum seeking controller for adjusting cooling tower air flow, according to an exemplary embodiment.

Referring now to FIG. 11, a block diagram of a BMS controller 1100 having an extremum seeking controller 1102 is shown, according to an exemplary embodiment. BMS controller 1100 provides a fan speed output for cooling tower fan system 1116 via communications interface 1104 and BMS network 1106. Communications interface 1104 can be or include an Ethernet port, a ZigBee transceiver, or electronics for supporting other standard or proprietary communications with BMS network 1106. In the embodiment shown in FIG. 11, chiller power monitor 1106 is between fan power source 1122 and fan motor 1118 and monitors the current demanded and expended by fan motor 1118. Fan power monitor 1120 provides this power to BMS controller 1100 via BMS network 1106. A similarly configured chiller power monitor 1108 is between chiller power source 1110 and chiller 1114, monitoring the current demanded by chiller 1114 (or the chiller's compressor). The power demanded by chiller 1114 is provided from chiller power monitor 1108 to BMS controller 1100 via BMS network 1106. BMS network 1106 is further connected to fan power monitor 1120 and may receive power usage information regarding fan motor 1118 or fan power source 1122. BMS network 1106 is further connected to cooling tower fan system 1116 and may receive other information relating to the operation of fan motor 1118. BMS network 1106 may then provide the received information to BMS controller 1100 via communications interface 1104. Further, BMS controller 1100 is connected to chiller controller 1112 and may send or receive other information or commands to and/or from chiller 1114. Using the power demand information from chiller power monitor 1108 and fan power monitor 1120, extremum seeking controller 1102 determines a new fan speed estimated to reduce power consumption of the system.

Figure 12:
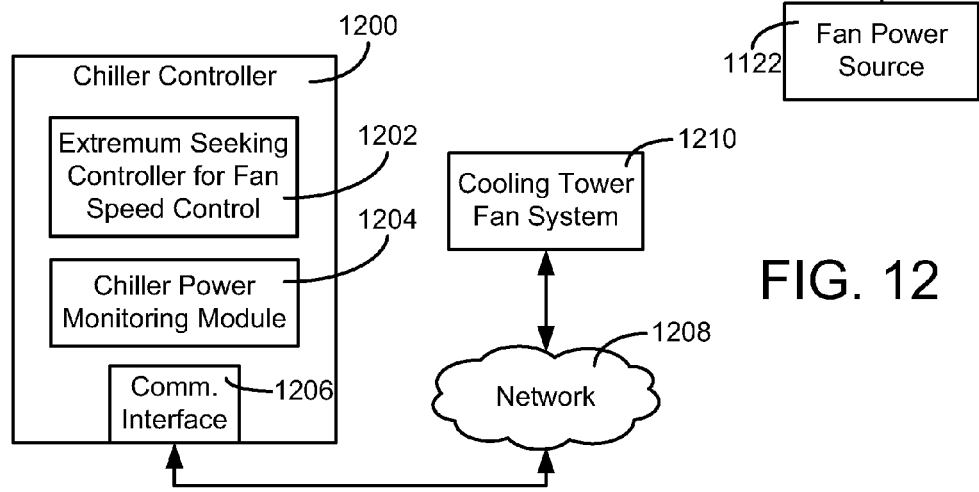
FIG. 12 is a block diagram of a chiller controller having an extremum seeking control module for adjusting cooling tower air flow, according to an exemplary embodiment.

Referring now to FIG. 12, a block diagram of a chiller controller 1200 connected to a cooling tower fan system 1210 via a network 1208 is shown, according to an exemplary embodiment. Chiller controller 1200 includes extremum seeking controller 1202 for fan speed control. Chiller controller 1200 further includes a chiller power monitoring module 1204 for monitoring or calculating power usage by the chiller. Chiller controller 1200 may connect to cooling tower fan system 1210 via network 1208 and communications interface 1206 to provide cooling tower fan system 1210 with the fan speed updated by extremum seeking controller 1202.

Figure 13:
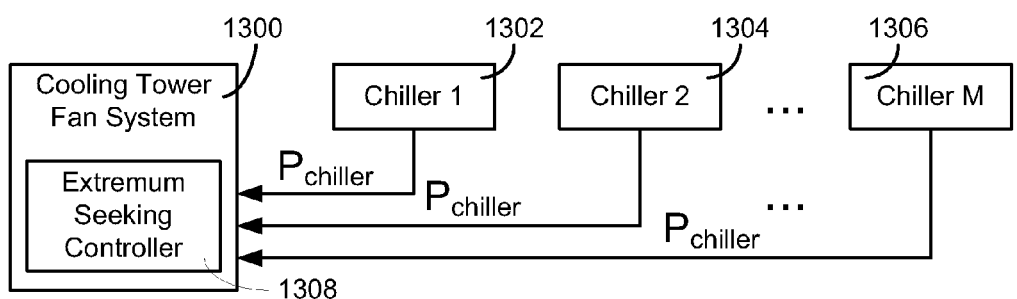
FIG. 13 is a block diagram of a cooling tower fan system having an extremum seeking controller for adjusting cooling tower air flow, according to an exemplary embodiment.

Referring now to FIG. 13, a block diagram illustrates multiple chillers connected to a cooling tower fan system 1300, according to an exemplary embodiment. The plurality of chillers 1302, 1304, 1306 are coupled to cooling tower fan system 1300 and provides cooling tower fan system 1300 with an input relating to the power usage of each chiller 1302, 1304, 1306. Extremum seeking controller 1308 receives the power usage inputs, aggregates the inputs, and uses the fan power expenditure plus chiller power expenditure to determine a new fan speed setting. According to various exemplary embodiments, extremum seeking controller 1308 may average the inputs to determine an average power usage per chiller, discard or increase the importance of one or more of the chiller power usage inputs, or may otherwise use the multiple inputs to determine a new fan speed.

Figure 14:
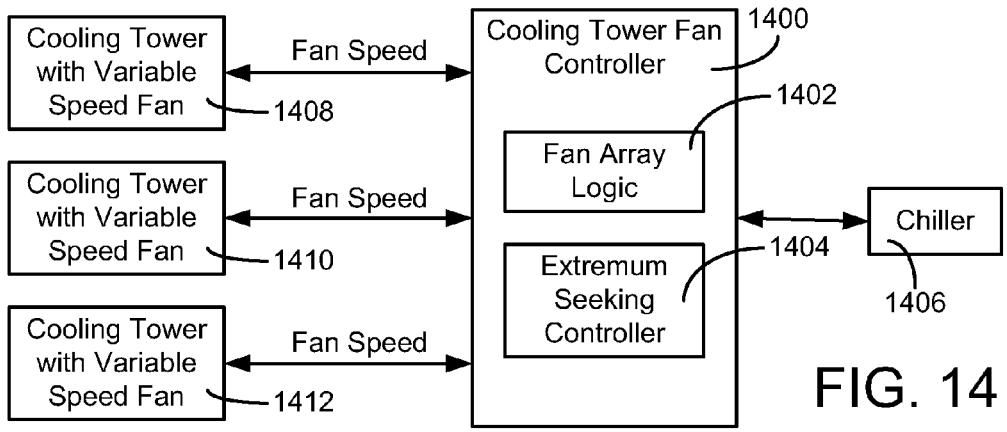
FIG. 14 is a block diagram of another cooling tower fan controller having an extremum seeking controller for adjusting cooling tower air flow, according to an exemplary embodiment.

Referring now to FIG. 14, another cooling tower fan controller 1400 is shown, according to an exemplary embodiment. Chiller 1406 provides a chiller power demand input to cooling tower fan controller 1400. Cooling tower fan controller 1400 is connected to multiple cooling towers 1408, 1410, 1412 that include variable speed fans. Extremum seeking controller 1404 may be used to determine an overall cooling tower array air flow or cooling capacity estimated to minimize chiller plus cooling tower array power. Extremum seeking controller 1404 can then provide the output of overall cooling tower array air flow of cooling capacity to fan array logic 1402. Fan array logic 1402 can then determine the particular fan speeds to provide to cooling towers 1408, 1410, and 1412. For example, extremum seeking controller 1404 can be configured to calculate a percentage of the aggregate cooling capacity of towers 1408-1412. Extremum seeking controller 1404 can then provide the output percentage, for example, fifty percent, to fan array logic 1402. Fan array logic 1402 can determine whether to operate the fans associated cooling tower 1408 and 1410 at relatively high speeds or whether to bring cooling tower 1412 "online". In other words, extremum seeking controller 1404 can determine and command an overall cooling amount (e.g., a requested cooling amount) while fan array logic 1402 can receive the cooling amount and determine how to provide the requested cooling amount using the multiple cooling towers. Similar fan array logic may also be used when one large cooling tower includes an array of fans that may be controlled separately.

Figure 15:
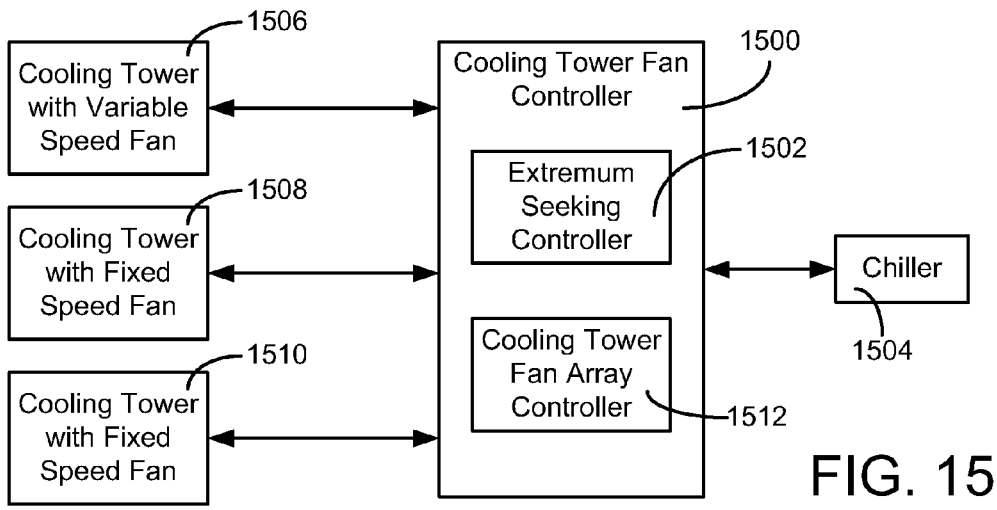
FIG. 15 is a block diagram of yet another cooling tower fan controller having an extremum seeking controller for adjusting cooling tower air flow, according to an exemplary embodiment.

Referring now to FIG. 15, another cooling tower fan controller 1500 is shown, according to an exemplary embodiment. Multiple cooling towers are utilized in the system of FIG. 15, with one of the cooling towers (1506) having a variable speed fan and the other cooling towers (1508, 1510) having fixed speed fans. Extremum seeking controller 1502 can again determine a total cooling amount or cooling capacity percentage while cooling tower fan array controller 1512 determines the particular outputs for the fans associated with cooling towers 1506-1510. For example, using a chiller power expenditure received from chiller 1504 and a calculated fan power expenditure, extremum seeking controller 1502 can determine a new total cooling amount and provide the new total cooling amount to cooling tower fan array controller 1512. Cooling tower fan array controller 1512 can determine whether to turn fan 1508 or fan 1510 on while also setting the proper variable speed of fan 1506.

Figure 16:
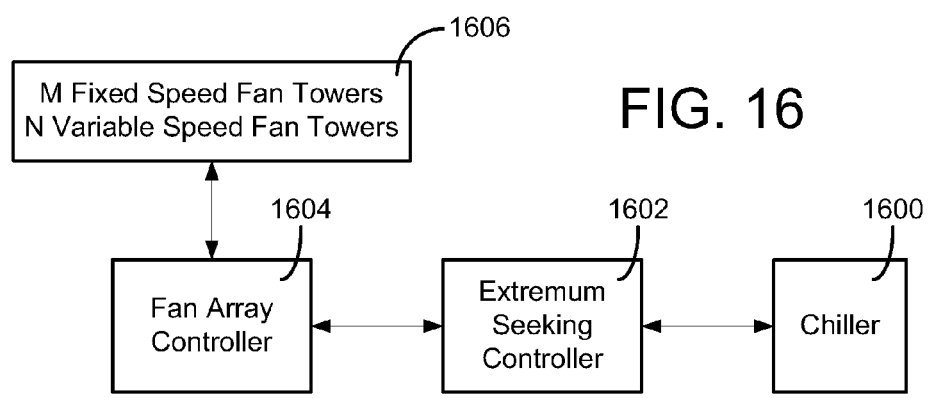
FIG. 16 is a block diagram of another extremum seeking controller for adjusting cooling tower air flow wherein the cooling tower system includes a fan array controller for controlling multiple fan towers, according to an exemplary embodiment.

Referring now to FIG. 16, a block diagram of a fan array controller 1604 for controlling a plurality of cooling towers 1606 is shown, according to an exemplary embodiment. Chiller 1600 provides chiller power usage to extremum seeking controller 1602, and extremum seeking controller 1602 used the input to determine an amount of cooling needed to be provided by towers 1606. Extremum seeking controller 1602 may send an appropriate cooling request to fan array controller 1604. Fan array controller 1604 determines the particular control scheme to use to meet the extremum seeking controller's cooling request.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A system for controlling a cooling tower that cools condenser fluid for a condenser of a chiller, comprising:
   a cooling tower fan system that controllably varies a speed of at least one fan motor; and
   an extremum seeking controller that receives inputs of power expended by the cooling tower fan system and of power expended by the chiller;
   wherein the extremum seeking controller provides an output to the cooling tower fan system that controls the speed of the at least one fan motor;
   wherein the extremum seeking controller determines the output by searching for a speed of the at least one fan motor that minimizes the sum of the power expended by the cooling tower fan system and the power expended by the chiller; and wherein the extremum seeking controller does not utilize temperature of the condenser fluid as an input.

2. The system of claim 1, wherein the extremum seeking controller is the only controller that controllably varies the speed of the at least one fan motor.

3. The system of claim 1, wherein the extremum seeking controller uses only the inputs of the power expended by the cooling tower fan system and the power expended by the condenser to determine the control signal.

4. A method for controlling a cooling tower that cools condenser fluid for a condenser of a chiller, comprising:
   receiving, at an extremum seeking controller, an input of power expended by a cooling tower fan system;
   receiving, at an extremum seeking controller, an input of power expended by the chiller;
   determining, using the extremum seeking controller and the inputs of power expended by the cooling tower fan system and the power expended by the chiller, a control signal representative of the speed of at least one fan motor for the cooling tower fan system; and wherein the extremum seeking controller does not utilize temperature of the condenser fluid as an input.

5. The method of claim 4, wherein the determining step comprises searching for a speed of the at least one fan motor that minimizes the sum of the power expended by the cooling tower fan system and the power expended by the condenser.

6. The method of claim 1, wherein the extremum seeking controller is the only controller that controllably varies the speed of the at least one fan motor.

7. The method of claim 4, wherein the extremum seeking controller uses only the inputs of the power expended by the cooling tower fan system and the power expended by the condenser to determine the control signal.

8. The method of claim 4, wherein the inputs are at least one of summed and combined prior to use by the extremum seeking controller.

* * * * *